Dec. 11, 1945.    B. E. DEL MAR ET AL    2,390,928
SEALING GLAND
Filed Oct. 27, 1942

BRUCE E DEL MAR
EDWARD E VAN DYKE
INVENTORS

BY
J. Edwin Coates
ATTORNEY

Patented Dec. 11, 1945

2,390,928

UNITED STATES PATENT OFFICE 2,390,928

SEALING GLAND

Bruce E. Del Mar, West Los Angeles, and Edward E. Van Dyke, Van Nuys, Calif., assignors to Douglas Aircraft Company, Inc., Santa Monica, Calif.

Application October 27, 1942, Serial No. 463,564

9 Claims. (Cl. 286—16)

This invention relates to a sealing gland of a type adaptable for use in pressurized aircraft wherein it is desirable to reciprocate control rods, cables and the like through an aperture in a wall separating a pressurized space from a non-pressurized area.

Because of problems which are encountered in maintaining pressures in an aircraft at values higher than ambient flight pressures, it is generally considered advisable to pressurize only that portion or portions of an airplane in which the passengers and crew are carried. This leaves the lower and tail portions of the fuselage, the wings and the empennage to which the various control surfaces are attached, in a non-pressurized condition. It is therefore necessary to have controlling means interconnecting with the pilot's compartment, the engines and the control surfaces which allows a relatively free movement of these controls through the wall between the pressurized and non-pressurized with a minimum loss of pressure from the pressurized cabin.

When a control rod or cable, to which we will hereinafter refer as a control, is drawn through the gland portion of the usual type sealing gland it fits either so loosely as to allow unnecessary freedom of movement of the control or so tightly that freedom of movement of the control is greatly impaired by friction. Both of these conditions are objectionable. For example the loose fit of the control in the sealing gland is accompanied by excessive leakage of air from the pressurized cabin. This leakage is dangerous since it places a greater burden on the supercharging equipment, in addition to endangering the lives of the occupants of the supercharged cabin to the extent that, if for any reason the supercharger fails, the air under pressure will not remain in the cabin long enough to enable the pilot to return the airplane to lower levels where repairs can be made.

If friction between sealing means and control means passing therethrough is excessive, the pilot will have a tendency to over control as a result of the necessity of expending too much effort in moving the controls which should normally move freely and smoothly. In addition, the pilot will be faced with the possibility of the controls seizing in the gland when subjected to extremely low temperatures.

In order to eliminate the objectionable features in a sealing gland as recited hereinabove, we have invented a sealing gland which is installed on the high pressure side of the fuselage wall separating the pressurized from the non-pressurized. This sealing gland is so constructed that it has the tendency to become more airtight as the pressure against it increases and functions to dampen the vibrations of the control in the seal itself. A lubricating means is also provided in the body of the sealing gland so that both freedom of movement of the control through the seal and the sealing qualities of the lubricant between the body of the gland and the control are assured.

It is an object of this invention to provide a simple, easily constructed control seal for pressurized aircraft which will insure an airtight seal on a control passing through a wall separating a pressurized from a non-pressurized.

Another object of this invention is to provide a seal which will become more airtight as the pressure against it increases.

Another object of this invention is to provide a means for lubricating the control where it passes through the seal so that friction is reduced and air tightness is improved.

Another object of this invention is to provide a means for automatically centering the control in addition to producing a vibration dampener therefor.

Still another object of this invention is to provide a means of regulating the flow of a lubricating fluid in the gland so that there is a constant movement of the fluid during reciprocation of the control.

Further objects and advantages of this invention will be brought out in the following description taken in conjunction with the accompanying drawing and appended claims.

Referring now to the drawing.

Figure 2:
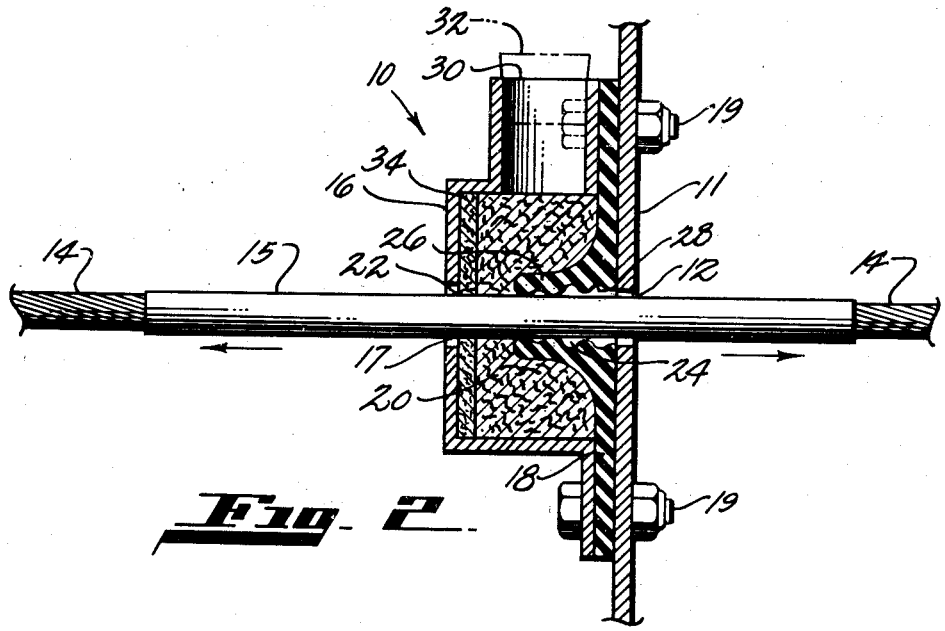
Figure 2 is a sectional view taken through the centerline of the sealing gland showing the means for lubricating the control in its reciprocating movement through the body of the sealing gland.

As best shown in Figure 2 of the drawing, the seal assembly 10 is installed on the pressurized side of a fuselage wall 11. An opening 12 is provided in the wall 11 to permit a control cable 14 having a bearing sleeve 15 swaged thereon to be passed therethrough. Instead of being swaged on the cable, the bearing sleeve 15 may be fixed thereon in any other manner providing a fluid tight engagement between the sleeve and cable. The seal itself is contained within a circular casing 16 provided with an aperture 17 and having one end thereof flat so that it will lie solidly against a gasket 18 which is interposed between the casing and the wall 11 and held thereto by bolts 19. The gasket is provided with a thickened center portion 26 which portion lies entirely on one side thereof so that it extends into the casing 16. The thickened portion of the gasket is further provided with a bore 24. This bore is tapered and provided with a plurality of annular grooves 28. These grooves are formed for the purpose of receiving fluid from a pervious material 20 placed in the casing 16 between a wiper 34 of deformable material having an opening 22 and the thickened portion of the gasket 18.

The bore of the gasket, the opening in the wiper, the opening in the casing and the opening in the wall are all coaxially aligned to form a "straight through" bore 22 through which the bearing sleeve 15 is adapted to pass.

The pervious material 20 is impregnated with a lubricating fluid which is supplied thereto through a port 30 in the upper portion of the casing 16. As shown in phantom lines in Figure 2 the port 30 may be plugged by a stopper 32 after filling so as to prevent impurities from getting into the fluid. After the fluid has filled the grooves 28, it cooperates therewith to prevent leakage of air along the bearing sleeve 15 through the bore 22. At the same time, the fluid serves to lubricate the sleeve on the control so that its reciprocating movement is relatively free from friction.

Figure 1:
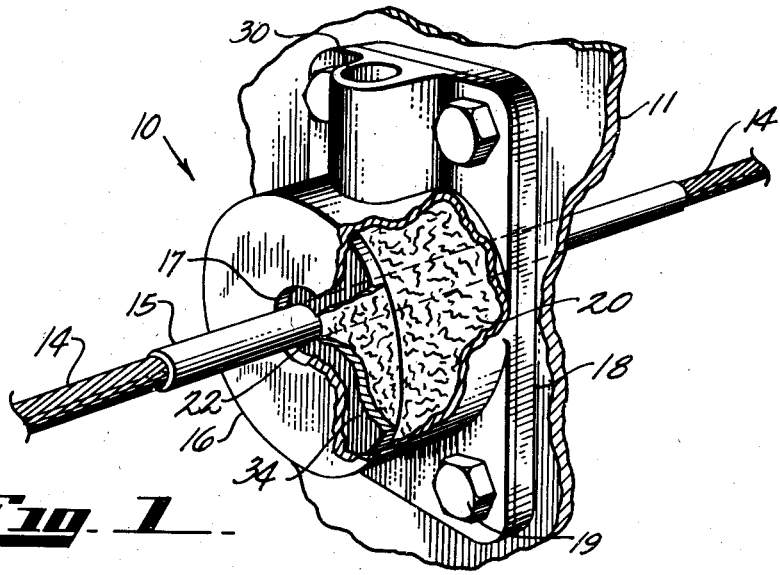
Figure 1 is a perspective view of the sealing gland with a portion of the gland cut away to show the wiper and the oil pervious material.

From Figures 1 and 2 of the drawing, it may be seen that the wiper 34 is positioned in the casing 16 to prevent fluid from leaking into the pressurized side of the wall 11. Furthermore it may be seen that as the control is moved to the right through the sealing gland the sleeve 15 of the control accumulates fluid from the pervious material 20 so that it lubricates and deposits fluid in the grooves 28 of the gasket 18. The bore in the thickened portion of the gasket is tapered and is relatively thin at its inner end so that its resiliency causes an elastic wiping action responsive to pressure in the cabin to be exerted at 26 upon the sleeve 15 swaged on the control cable. This action, coupled with the sealing action of the fluid, prevents air passing through the sealing gland. When the sleeve 15 is drawn to the left, the fluid which adheres to the sleeve will be drawn along therewith and returned in part to the pervious material. Thus it may be seen that there is a constant movement of fluid during the reciprocation of the control.

It may readily be seen that for efficient operation of the sealing gland the control must present a perfectly smooth surface to the bore of the sealing gland and must maintain a proper sealing relation therewith as it bears against the pervious material and the thickened portion of the gasket in reciprocation.

It is general practice to use cables for controls and in order to provide a smooth surface throughout the full length of cable passing through a sealing gland it has been the practice to cut the cable, insert a piece of rod and then swage the cable to the ends thereof. The cutting of the cable as a rule is not desirable since it adds two mechanical joints subject to failure. Therefore, in order to obtain the smooth surface desired with a one piece cable, we pass a smooth metal sleeve over the cable before fabrication is complete, to that portion of the cable which reciprocates through the sealing gland. The sleeve is then swaged in place so as to provide a smooth surface of sufficient length to remain within the sealing gland throughout the full movement of the control.

We claim:

1. A radially yieldable sealing structure for apertures provided for the passage of control elements through the wall of an enclosed space maintained at superatmospheric pressure, comprising: a casing having an opening at one side; a gasket of flexible material positioned between said open side of the casing and a wall of said enclosed space having an aperture therein, said gasket having a thickened portion provided with a bore aligned with said aperture in the wall, and projecting into said casing, annular corrugations being provided in the wall of the bore acting to scrape off and retain lubricant, the number of corrugations engaged with the surface of the control element increasing with increase of pressure differential between the pressure in the enclosed space and the ambient pressure; means for securing said casing and gasket to said wall around the aperture therein, the wall of said casing being provided with an aperture opposite said aperture of the enclosed space; a wiper element in the wall of the enclosed space; a wiper element arranged against the inside of the apertured wall of the casing having an opening aligned with said aperture, a control cable having a cylindrical sleeve swaged thereto extending from the enclosed space through said sealing structure and wall and having a loose fit in the apertures in the wall of said casing and said wall of the enclosed space, but having a close sliding fit in the opening in said wiper element and in the bore of said gasket; deformable lubricant retaining material packed in the vacant spaces of said casing; and a lubricant receiving port communicating with said lubricant retaining material, the seal construction acting to prevent loss of pressure from said enclosed space while permitting longitudinal movement of the element and radial play necessary to permit proper functioning of the element.

2. A radially yieldable sealing structure for apertures provided for the passage of control elements through the walls of an enclosed space maintained at superatmospheric pressure, comprising: a casing having an opening at one side; a gasket of flexible material positioned between said open side of the casing and a wall of said enclosed space having an aperture therein, said gasket having a thickened portion provided with a bore aligned with said aperture in the wall, and projecting into said casing and tapering in cross section toward the free end, annular corrugations being provided in the wall of the bore acting to scrape off and retain lubricant, the number of corrugations engaged with the surface of the control element increasing with the increase of pressure differential between the pressure in the enclosed space and the ambient pressure; means for securing said casing and gasket to said wall around the aperture therein, the wall of said casing being provided with an aperture opposite said aperture in the wall of the enclosed space; a wiper element arranged against the inside of the apertured wall of the casing having an opening aligned with said aperture; a smooth surfaced element extending from the enclosed space through said sealing structure and wall and having a loose fit in the apertures in the wall of said casing and said wall of the enclosed space, but having a close sliding fit in the opening in said wiper element and in the bore of said gasket; and means for lubricating said element between said wiper and said thickened portion of the flexible gasket, the seal construction acting to prevent loss of pressure from said enclosed space while permitting longitudinal movement of said element and radial play necessary to permit proper functioning of the element.

3. A radially yieldable sealing structure for apertures provided for the passage of control elements through the walls of an enclosed space maintained at super-atmospheric pressure, comprising: a casing having an opening at one side and an aperture aligned with said opening and formed in the wall of the casing opposite said opening; a gasket of flexible material positioned between said open side of the casing and a wall of said enclosed space having an aperture therein; means for securing said casing and gasket to said wall around the aperture therein to form a pressure tight seal therearound, said gasket having a thickened portion projecting into said casing provided with a bore aligned with said aperture in the wall; annular corrugations in the wall of the bore acting to scrape off and retain lubricant, the number of corrugations engaged with the surface of the control element increasing with the increase of pressure differential between the pressure in the enclosed space and the ambient pressure; a wiper element arranged against the inside of the apertured wall of the casing having an opening aligned with said aperture; a smooth surfaced element extending from the enclosed space through said sealing structure and wall and having a loose fit in the apertures in the wall of said casing and said wall of the enclosed space, but having a close sliding fit in the opening in said wiper element and in the bore of said gasket; and means for maintaining lubricant in said casing to lubricate said smooth surfaced element, the seal construction acting to prevent loss of pressure from said enclosed space while permitting longitudinal movement of said element and radial play necessary to permit proper functioning of the element.

4. A radially yieldable sealing structure for apertures provided for the passage of control elements through the walls of an enclosed space maintained at superatmospheric pressure, comprising: a casing having an opening at one side; a gasket of flexible material positioned between said open side of the casing and a wall of said enclosed space having an aperture therein, said gasket having a thickened portion projecting into said casing and provided with a bore aligned with said aperture in the wall, said bore adjacent its inner end closely fitting said control element at all times but progressively contacting said control element with increase in pressure differential between that in the enclosed space and the ambient pressure; means for securing said casing and gasket to said wall around the aperture therein, the wall of said casing being provided with an aperture opposite said aperture in the wall of the enclosed space; a wiper element arranged against the inside of the apertured wall of the casing having an opening aligned with said aperture; a smooth surfaced element extending from the enclosed space through said sealing structure and wall and having a loose fit in the apertures in the wall of said casing and said wall of the enclosed space, but having a close sliding fit in the opening in said wiper element and in the bore of said gasket; and means for lubricating said element between said wiper and said thickened portion of the flexible diaphragm, the seal construction acting to prevent loss of pressure from said enclosed space while permitting longitudinal movement of said element and radial play necessary to permit proper functioning of the element.

5. A radially yieldable sealing structure for apertures provided for the passage of control elements through the wall of an enclosed space maintained at a pressure above the ambient pressure, comprising: a casing having an opening at one side and an aperture in a wall of the casing opposite said opening; a gasket of flexible material arranged between said open side of the casing and a wall of said enclosed space provided with an opening for the passage of a control therethrough; means for holding the casing and gasket in pressure tight relation against said wall of the enclosed space and around the opening therein; a deformable sleeve on said gasket with the bore thereof coaxial with the aperture in the wall of the casing and the opening in the wall of the enclosed space, the smooth surfaced element riding through said sleeve in pressure tight relation and the sleeve contacting the surface of said element over a length increasing with increase in pressure differential of the air within and outside said enclosed space; a wiper arranged against the inner side of the apertured wall of the casing, said wiper being formed as a member having an opening therein aligned with the aperture in said casing wall; and means arranged within the casing for lubricating the surface of said control, the smooth surfaced element moving freely through the apertures in the casing and the opening in the wall of the enclosed space but having a close sliding fit through the opening in the wiper and the bore of the sleeve.

6. A radial yieldable sealing structure as set forth in claim 5 and in addition comprising: a continuous series of annular grooves in the wall of the bore in the deformable sleeve from outer to inner end of said bore, to retain lubricant carried by the surface of said element into said bore, the retained lubricant serving to maintain a film of lubricant on said control surface in said bore.

7. A radially yieldable sealing structure for control elements passing through a wall of an enclosed space maintained at a pressure higher than that outside said enclosed space, comprising: a casing having an opening in a wall thereof spaced from a wall of said space having an opening therein for the passage of a control element, the casing having an open side surrounding the opening in said wall; a gasket of flexible material arranged between the casing and the wall of said space and forming a pressure tight seal between the wall and said casing around said opening and having a sleeve arranged coaxially with the opening in said casing and wall opening, and extending into said casing; means for securing the casing and gasket to said wall surrounding the opening therein; means acting to bring lubricant into contact with the entire surface of the control element between the inward end of said sleeve and the opposite wall of the casing, the control element passing freely through the openings in said casing and said wall but having a close sliding fit through said wiper and the bore of said sleeve.

8. A sealing structure for an opening formed in the wall of an enclosed space maintained at super-atmospheric pressure comprising: a casing open at one side and having an aperture formed in a wall opposite to said open side; a gasket of flexible material; a conoidal member integral with said gasket and laterally projecting from a surface thereof, said member being formed with a bore therethrough progressively decreasing in diameter toward the free end thereof; means for mounting said casing to the inner surface of the wall of said enclosed space with an aperture therein in alignment with the opening of said wall and with the gasket clamped between the casing and the wall to seal the joint therebetween, said conoidal member projecting into said casing and being so disposed relative to the same that the bore therein is in alignment with the aperture in the wall of said casing; a wiper element arranged against the inner side of the apertured wall of the casing and having an opening in alignment with said aperture; an elongate smooth surfaced control element mounted for reciprocal movement and extending from the enclosed space through said sealing structure and having a loose sliding fit in the aperture in the wall of said casing and in the opening formed in the wall of the enclosed space, but having a close sliding fit in the opening in the wiper element and in the bore of said conoidal member; deformable lubricant retaining material completely filling said casing and contacting the surface of said element between the inner end of the conoidal member and said wiper element, said casing having a lubricating receiving opening communicating with said lubricating retaining material; and annular corrugations formed in the wall of the bore of said conoidal member for removing lubricant from the surface of said control element as the same is reciprocally moved relative to the wall of said enclosed space and for retaining the lubricant removed, the super-atmospheric pressure within said space causing the conoidal member to be compressed about the control element, and the number of corrugations engaged with the surface of the control element increasing as the differential between the pressure in the enclosed space and the ambient pressure increases.

9. In an airplane a radially yieldable sealing structure for an aperture provided for the passage of a control element through the wall of an enclosed space maintained at super-atmospheric pressure, comprising: a casing having an opening at one side and an aperture aligned with said opening formed in the wall of the casing opposite said opening; an unitary gasket of flexible material positioned between said open side of the casing and the inner surface of a wall of said enclosed space and having an aperture therein; means for securing said casing and gasket in pressure tight relation to the inner surface of said wall around the aperture therein; a laterally projecting portion of the inner surface of said gasket formed with a bore progressively decreasing in diameter toward the free end thereof, said bore being aligned with said aperture in the wall; annular corrugations in the wall of the bore acting to scrape off and retain lubricant, the number of corrugations engaged with the surface of the control element increasing with increase of pressure differential between the pressure in the enclosed space and the ambient pressure; a wiper element arranged against the inside of the apertured wall of the casing and having an opening aligned with said aperture; a smooth surfaced element extending from the enclosed space through said sealing structure and wall and having a loose fit in the aperture and opening in the wall of said casing and in the aperture in said wall of the enclosed space, but having a close sliding fit in the opening in said wiper element and in the bore of said gasket; deformable lubricant retaining material packed in the vacant spaces of said casing, in contact with the smooth surfaced element between the inner end of the thickened portion of said gasket and said wiper element; and a lubricant receiving port communicating with said lubricant retaining material; and closure means for said lubricant receiving means.

BRUCE E. DEL MAR.
EDWARD E. VAN DYKE.